Dec. 20, 1932.                 C. W. MANZEL                    1,891,647
                              LUBRICATING SYSTEM
                           Filed April 6, 1925        2 Sheets-Sheet 1
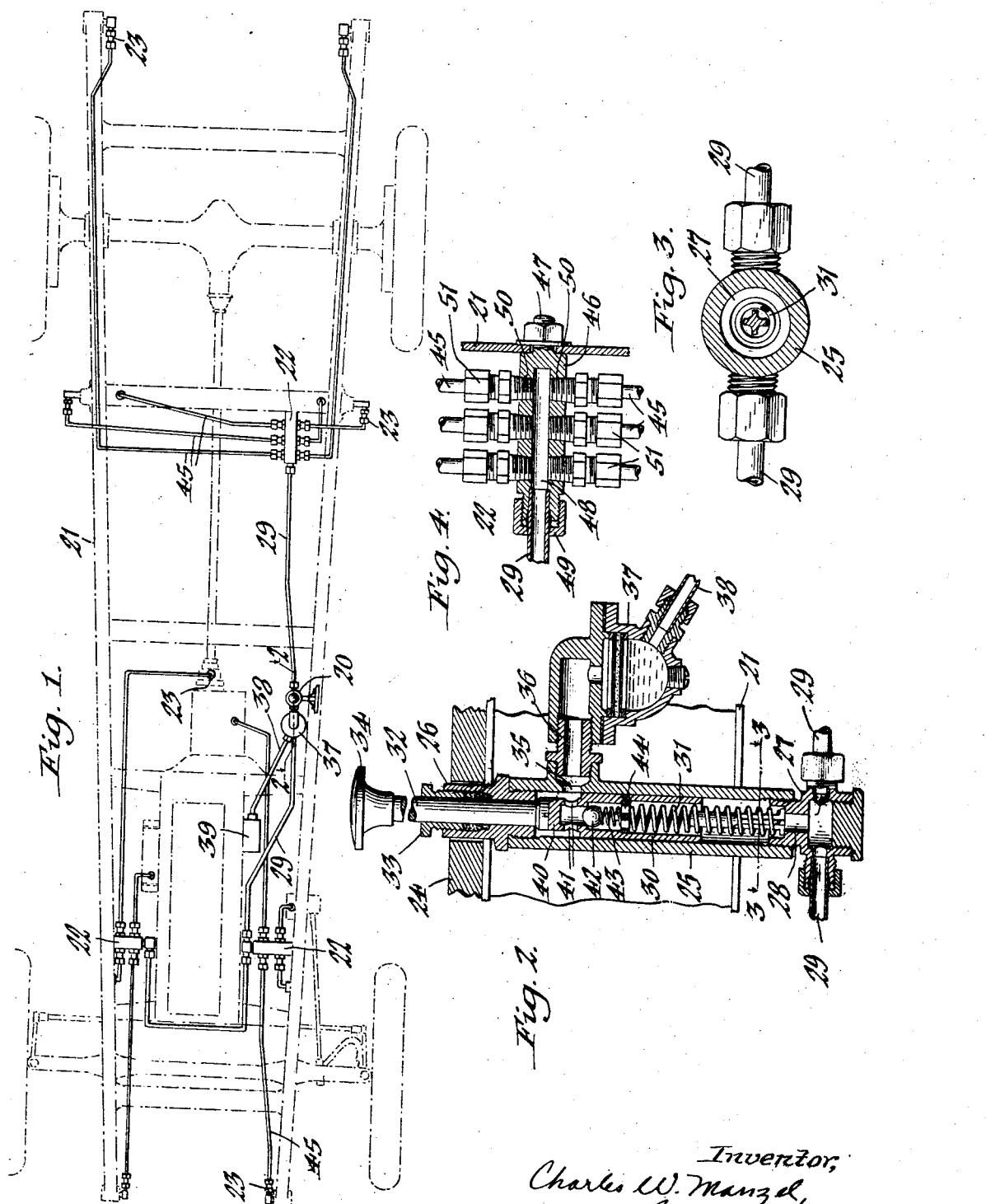
Inventor,
Charles W. Manzel,
by Geyer & Geyer
Attorneys.

Dec. 20, 1932.  C. W. MANZEL  1,891,647
LUBRICATING SYSTEM
Filed April 6, 1925   2 Sheets-Sheet 2
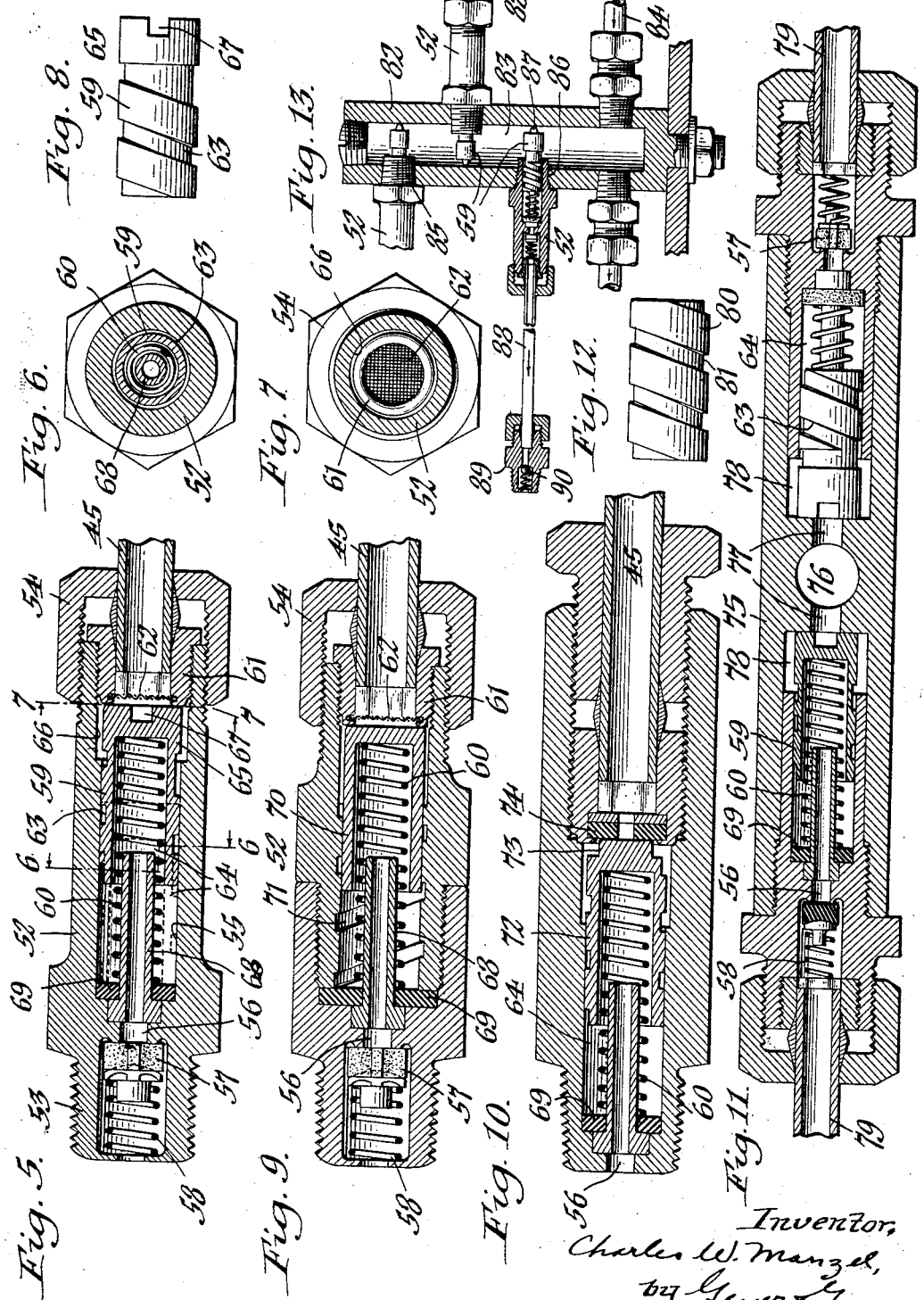
Inventor,
Charles W. Manzel,
by Geyer & Geyer
Attorneys.

Patented Dec. 20, 1932

1,891,647

UNITED STATES PATENT OFFICE

CHARLES W. MANZEL, OF BUFFALO, NEW YORK

LUBRICATING SYSTEM

Application filed April 6, 1925. Serial No. 20,884.

This invention relates generally to a lubricating system for machinery of various kinds, but more particularly to a centralized chassis lubricating system for automobiles, motor trucks and similar vehicles.

The principal object of the invention is to provide a lubricating system of this character having simple, efficient and reliable means whereby all the bearing points of the automobile or other vehicle are thoroughly lubricated in a few seconds time directly from the drivers seat.

Another object is to provide a measuring unit or meter pump for accurately measuring or controlling the amount of lubricant delivered under pressure to any one bearing or bearings in response to a single impulse of the operating pump.

With the above and other objects in view, the invention consists in the novel features of construction and arrangement of parts hereinafter referred to and particularly pointed out in the appended claims.

In the accompanying drawings:—

Figure 1 is a top plan view of an automobile chassis equipped with my centralized lubricating system. Figure 2 is an enlarged transverse vertical section of the operating pump taken on line 2—2, Fig. 1. Figure 3 is an enlarged horizontal section on line 3—3, Fig. 2. Figure 4 is an enlarged horizontal section of one of the feed distributing units or manifolds. Figure 5 is an enlarged longitudinal section of the preferred form of measuring unit or meter pump. Figs. 6 and 7 are transverse sections on the correspondingly numbered lines in Fig. 5. Figure 8 is a side elevation of the meter-pump piston-valve. Figs. 9, 10 and 11 are longitudinal sections of modified forms of the measuring unit or meter pump. Figure 12 is an elevation of a modified form of meter pump piston-valve. Figure 13 is a sectional view showing a different arrangement of the measuring units.

Similar characters of reference indicate corresponding parts throughout the several views.

In its general organization, the various parts entering into the lubricating system, include an operating pump 20 connected with the lubricant supply of the vehicle-motor for delivering the lubricant under pressure to the various bearings and fastened to the vehicle frame 21 at a suitable point where it can be conveniently controlled by the operator; a plurality of distributing units or manifolds 22 in communication with the pump, one being preferably located at the rear end of the chassis for supplying the lubricant to the rear spring bearings and adjoining parts, and two being located at the front end of the chassis for supplying the lubricant to the front spring bearings, front axle and the various parts of the engine; and a plurality of measuring units or meter pumps 23 for regulating the amount of lubricant delivered to the various bearing-points in response to a given impulse or stroke of the operating pump.

The operating pump shown in the drawings, particularly Figs. 2 and 3, is fastened to the vehicle-frame below the floor-board 24, and preferably consists of a barrel or cylinder 25 having its ends internally-threaded to receive upper and lower screw plugs or caps 26, 27, respectively, the lower plug containing an outlet passage 28 and having pipes or conduits 29 connected to opposite sides thereof and leading to the distributing units 22. Operating in the cylinder is a hollow piston or plunger 30 normally held in its elevated position by a spring 31, while a plunger-rod 32 extending through the upper cylinder-plug 26 above the floor-board and abutting at its lower end against the upper end of the plunger serves to force the latter downwardly in its cylinder to discharge the lubricant therefrom under pressure. A packing nut 33 prevents leakage of the lubricant into the car-body and a foot-engaging knob 34 is applied to the upper end of the plunger for conveniently actuating it. Near its upper end the cylinder has an oil-inlet passage 35 to which one end of a coupling-sleeve 36 is connected, the other end thereof serving as a means for fastening a suitable oil filter 37 thereto, which, as shown in Fig. 1, is connected by a pipe 38 with the circulating oil pump 39 of the vehicle. The plunger is provided in its reduced head 40 with one or more inlet ports 41, which in the normal elevated position of said plunger, as shown in Fig. 2, are disposed opposite and in line with the cylinder inlet 35. A downwardly-opening check-valve 42 controls the admission of the oil into the plunger-bore and cylinder, a spring 43 bearing at its upper end against the valve and at its lower end against a by-passed plug 44 tending normally to hold said valve closed. This valve-spring is comparatively light so that the valve will open when the oil is being circulated in the engine by the pump 39, which usually developes a pressure of approximately 25 pounds. On the down or operating stroke of the plunger, the valve 42 remains closed and the oil contained in the cylinder is forced under pressure through its outlet passage 28 to the pipes 29 leading to the various distributing units 22 and thence through pipes 45 connected to the various measuring units 23.

Each distributing unit or manifold preferably consists of a block-like fitting 46 having a threaded-stem 47 at one end for fastening it to the vehicle-frame 21. In its body, this fitting has an oil-receiving chamber 48 to the inlet end of which the corresponding pipe 29 is connected, as by clamping nut 49. Screwed into transverse openings 50 intersecting the manifold-chamber are suitable couplings 51 to which are connected the inner ends of the pipes 45 leading to the measuring units.

In the preferred construction of the measuring units or meter pumps, shown in Figs. 5, 6, 7 and 8, each consists of a nipple or fitting 52 which has a threaded stem or neck 53 at its outlet end for attaching it to the bearing-point, while fastened to its opposite or inlet end by a clamping nut or sleeve 54 is the outer end of the corresponding supply pipe 45 leading from the distributer. Extending lengthwise of the nipple from the inlet end thereof to a point near the outlet end thereof is a cylindrical bore 55 and connecting the latter with the outlet end of the nipple is an outlet port 56 controlled by a forwardly-opening check valve 57, preferably in the form of a triangularly-shaped disk, normally held closed by a spring 58. Operable in the nipple-bore is a hollow piston-valve or plunger 59, which is closed at its rear end and open at its front end, a spring 60 serving to hold the same in its retracted or normal position shown by full lines in Fig. 6. In this position, said piston-valve bears against the front face of a ported plug 61 screwed into the rear end of the nipple and containing a filtering screen 62 for the oil. The piston-valve is provided in its exterior face with a comparatively-shallow oil-conducting passage or channel 63 through which the oil from the pipe 45 is delivered into the measuring chamber 64 formed by the hollow piston and that part of the nipple-bore in front of the latter. As shown, this oil conducting passage 63 is preferably in the form of a spiral groove extending around the piston-valve from its front end to a point short of its rear portion or head 65, which is ungrooved and serves to close off said passage and prevent the admission of oil to the measuring chamber shortly after the piston-valve starts its forward movement to expel the lubricant from the measuring chamber into the respective bearings. At its rear or inlet end, the nipple-bore terminates in a counter-bore or enlargement 66 into which the oil is first delivered before being conducted through the spiral opening formed between the piston-valve and the nipple-bore. On the return or backward stroke of the piston-valve, a vacuum is created in the measuring chamber and the oil is drawn into the same through the spiral port. The enlargement 66 of the nipple-bore into which the head of the piston-valve and the adjoining end of its spiral groove normally projects, as shown in Fig. 5, not only allows the quick return of the piston-valve but permits the prompt refilling of the measuring chamber. The head of the piston-valve has a transverse groove or passage 67 in its face for facilitating the discharge of oil from the inlet end of the nipple into its enlarged bore 66, and also for drawing the oil into the latter after the piston-valve returns to its normal position.

As shown in Fig. 6, a tubular guide or stem 68 is provided for properly centering the piston-valve spring 60, said guide projecting partly into the piston-valve and also constituting a passage establishing communication between the measuring chamber 64 and the outlet port 56. Located at the bottom of the nipple-bore 55 and surrounding the spring-guide is a packing or washer 69 forming a seat against which the open end of the piston-valve is adapted to engage in the forward position thereof, and thereby positively seal the further admission of oil to the measuring chamber when said piston-valve reaches its forward position, shown by dotted lines in Fig. 5.

In lubricating the bearings with this improved centralized system, it is only necessary to force the pump-plunger 30 downwardly in its cylinder by stepping on the foot-engaging knob 34 of the plunger rod, this one operation resulting in a predetermined amount of oil being delivered to each and every bearing connected to the system. The pressure created in the various supply pipes 45 after each impulse or down-stroke of the pump-plunger forces the corresponding piston-valves 59 of the respective nipples 52 forwardly or downwardly to expel the oil contained in the corresponding measuring chambers 64 through their tubular stems 68 and outlet ports 56 into the respective bearings of the vehicle. During the initial forward movement of the piston-valve, and before its head enters the cylinder 55, some oil is delivered into the measuring chamber through the spiral groove on said valve. Before the latter reaches the end of its stroke, however, its head 65 enters the bore of the nipple and shuts off the admission of oil to the measuring chamber, the remaining portion of the piston-valve stroke being merely for the expulsion of oil from said chamber. On the return stroke of the piston-valve, which is automatically effected after the foot is removed from the plunger-rod knob, and after the piston valve-head 65 passes into the enlarged bore 66 of the nipple, the oil contained in said bore is then sucked or drawn through the spiral groove of the piston-valve into the measuring chamber, the amount of oil admitted being substantially equal to that previously expelled. It will be noted, that the meter units or nipples have a pump-like action, expelling the oil from the measuring chambers in response to each downward impulse of the pump-plunger 30 and again refilling said chambers on the return stroke of the plunger, the latter being forced downwardly one or more times depending on the quantity of oil it is desired to deliver to the several bearing-points. In practice, the measuring chambers are of a size to deliver, say, from 6 to 8 drops of oil at a given impulse of the pump-plunger.

The spiral formation of the oil-conducting groove in the relatively short piston-valve provides a comparatively large port area for the admission of oil into the measuring chamber on the return stroke of the valve, while on the initial forward or operating stroke of the latter, this spiral groove and the oil contained therein resist more or less the by-passing of the oil into said measuring chamber. It is to be understood that the spiral grooves may be varied as to their length and area, depending on the density or viscosity of the lubricant and also on the number of feed units employed in order to deliver a predetermined amount of lubricant to the bearings, as may be required.

In the modified form of the nipple shown in Fig. 9, the piston-valve 70 is smooth-faced and the bore of the nipple is provided with a spiral oil-conducting groove 71. Otherwise the construction is identical with the preferred type of nipple previously described.

The modification illustrated in Fig. 10 eliminates the check-valve 57 for controlling the oil outlet port 56. In this case, the rear end of the piston-valve 72 has a reduced head 73 which normally seats against a packing-washer or seat 74 and prevents leakage of the oil into the nipple-bore.

In the modified form of the invention shown in Fig. 11, a plurality of metering pumps are connected to a distributer fitting 75 having a common oil inlet 76 communicating with the transverse ports 77 opening into the pump cylinders 78 formed in said fitting and each containing the metering units which are identical in construction with that shown in Fig. 5. The outlet ends of these units are suitably connected by pipes 79 with the respective bearings to be lubricated.

In the modified construction of the piston-valve shown in Fig. 12, the same consists of a cylindrical body 80 having a spiral oil-conducting groove 81 extending from end to end of the valve. In this case, as well as in the arrangement of the spiral-groove 71 in the nipple bore shown in Fig. 9, a relatively quick impulse to the pump-plunger 30 is preferable, so that during the resulting quick or continuous forward movement of the piston-valve in its cylinder, the spiral groove and the oil contained therein act to effectually resist the by-passing of the oil into the measuring chamber.

Instead of using the distributer units 22 and applying the metering pumps or nipples 52 directly to the bearing-points in the manner illustrated in Fig. 1, a plurality of the nipples may be attached to a suitable fitting 82 containing an oil-receiving chamber or channel 83 connected with the pump 20 by a pipe 84. This fitting is fastened to the vehicle frame where it is centrally located relatively to a given number of bearings. As shown, the nipples are preferably arranged one above the other, their attaching ends 85 engaging threaded openings 86 in the side walls of the fitting. The rear ends of the piston-valves 59 project across the oil chamber 81 and may be provided with suitable bosses 87 for holding the same a sufficient distance from the chamber wall to permit the oil under pressure to act on said piston-valves and move them forwardly to expel the oil from their measuring chambers. The outlet ends of the nipples 52 are connected by pipes 88 with the bearings which are equipped with suitable couplings 89 containing spring-pressed check-valves 90 to retain the oil in the pipe.

It will be understood from the foregoing that various other modifications can be made within the scope and spirit of the appended claims, and I do not therefore wish to be limited to the particular construction and arrangement of parts herein shown and described.

I claim as my invention:

1. A lubricating system for the bearings of motor vehicles and the like, comprising a pump for delivering lubricant under pressure to the bearings, and nipples applied to the bearings and each including a measuring chamber for the lubricant having an inlet connected with the pump and an outlet, and a ported valve slidable in said chamber for controlling the admission and discharge of lubricant to and from the same, the operating stroke of the pump moving the ported-valve in a direction to expel the lubricant from its chamber and the return stroke thereof moving said valve in the opposite direction to draw the lubricant through the port of the valve in the measuring chamber, said port being arranged to prevent the admission of lubricant to said chamber during the major portion of the operating stroke of its valve and to permit the admission of lubricant thereto when the valve approaches the end of its return stroke.

2. A lubricating system for the bearings of motor vehicles and the like, comprising a pump for delivering lubricant under pressure to the bearings, and nipples applied to the bearings and each including a cylinder having an enlargement at its rear end communicating with said pump and an outlet at its front end, a piston-valve operable in said cylinder and having a lubricant-conducting groove in its exterior face extending from the front end to a point near its rear end and normally opening into said cylinder-enlargement, the piston-valve being moved forwardly in its cylinder at each operating impulse of the pump and the ungrooved rear portion of said valve forming a closure for preventing the flow of lubricant into the cylinder during the major portion of its operating stroke, and means for yieldingly moving the piston-valve rearwardly in its cylinder.

3. A lubricating system of the character described, comprising a pump for delivering lubricant under pressure to the bearings, bearing-nipples applied to said bearings and each including a measuring chamber for the lubricant having an inlet connected with the pump and an outlet, a piston-valve slidable in said chamber and having a port in its exterior face extending substantially from end to end thereof for conducting lubricant from the inlet end of the measuring chamber to the interior thereof in front of said piston-valve, the piston-valve being moved forwardly in its measuring chamber on the operating stroke of the pump, and a spring for normally holding said piston-valve against the inlet end of said chamber, the port of the piston-valve terminating short of its rear end to prevent the flow of lubricant through the same during the major portion of the forward stroke of said piston-valve.

4. A lubricating system of the character described, comprising a pump for delivering lubricant under pressure to the bearings, nipples applied to said bearings and each including a cylinder having an inlet connected with said pump and an outlet, a piston-valve operable in the cylinder and having a spiral groove in its face for conducting the oil from the inlet to the outlet end of said cylinder, the space between the outlet end of said cylinder and said piston-valve constituting a measuring chamber from which the oil is expelled when the piston-valve is moved forwardly in response to the operating stroke of said pump, means for cutting off the flow of oil to said chamber at a predetermined point in the operative stroke of the piston-valve, the latter being free to move the balance of its stroke to expel the lubricant from its chamber, and a spring for moving said piston-valve rearwardly in its cylinder, the lubricant being sucked into the measuring chamber from the inlet end of said cylinder through said spiral groove on the return stroke of the piston-valve.

5. A lubricating system of the character described, comprising a pump for delivering lubricant under pressure to the bearings, nipples applied to said bearings and each including a cylinder having an inlet connected with said pump and an outlet, a hollow piston-valve operable in the cylinder, said valve being closed at its rear end and open at its front end and having a spiral groove on its face for conducting the oil from the rear end of the cylinder to the front end thereof, said cylinder and the hollow portion of said piston-valve constituting a measuring chamber from which the oil is expelled when the piston-valve is moved forwardly in response to the operating stroke of the pump, a packing at the forward end of the cylinder against which said piston-valve is adapted to seat and forming an oil-tight seal, a spring for moving said piston-valve rearwardly in its cylinder, and means at the rear end of the latter against which said valve normally abuts.

6. A lubricating system of the character described, comprising a pump for delivering lubricant under pressure to the bearings, nipples applied to said bearings and each including a cylinder having an enlargement at its rear end communicating with said pump and an outlet at its front end, a piston-valve operable in said cylinder and having a spiral groove in its face extending from the front end thereof to a point near its rear end and normally opening into said cylinder-enlargement for conducting the lubricant from the latter into the cylinder, the piston-valve being moved forwardly in its cylinder at each operating impulse of the pump, and the ungrooved rear portion of said valve forming a closure for the cylinder during such operating stroke, and means for yieldingly moving the piston-valve rearwardly in its cylinder.

7. In a lubricating system for motor vehicles, the combination with the circulating oil pump thereof and a plurality of bearings to be lubricated, of a booster-pump connected with said circulating pump for increasing the pressure thereof, and a plurality of nipples for said bearings connected with said booster-pump, and each including an oil-receiving chamber having an inlet, an outlet and means in said chambers for controlling the admission of a predetermined quantity of oil to the bearings at each impulse of the booster pump, the circulating pump being incapable of governing the flow of oil to the bearing nipples.

8. In a lubricating system for motor vehicles, the combination with the circulating oil pump thereof and a plurality of bearings to be lubricated, of bearing-nipples applied to said bearings and each including a measuring chamber having an inlet, an outlet and a piston-operated valve for controlling the admission and expulsion of oil to and from said chamber, and a manually-operated booster pump interposed between said circulating pump and said bearing nipples and controlling said piston-valves.

9. A lubricating attachment, comprising a body containing a lubricant chamber having an inlet and an outlet, a piston-valve operable in said chamber by lubricant pressure and having a spiral groove on its exterior face for establishing communication between the chamber-inlet and that portion of the chamber in front of the piston valve, said spiral groove constituting a resistance element for preventing the flow of lubricant to said chamber during the forward stroke of the piston-valve and a yieldable packing at the outlet end of said chamber against which said valve is adapted to seat.

10. A lubricating attachment, comprising a body containing a lubricant chamber having an inlet, and an outlet, a ported filtering-plug fitted in said inlet, a check valve applied to said outlet, a spirally-ported piston-valve operable in said chamber between the inlet and outlet ends thereof, said spiral port being formed in the exterior face of the valve and being restricted in size and constituting a time element for predetermining the amount of lubricant delivered through said port, a spring for normally holding said valve against said filtering-plug, and means for cutting off the admission of lubricant to said chamber after the discharge of a predetermined quantity of lubricant therefrom.

11. A lubricating attachment, comprising a body containing a lubricant chamber having an inlet and an outlet, said chamber terminating at its inlet end in an enlargement, and a piston-valve operable in said chamber for controlling the admission and expulsion of lubricant to and from the same, said valve having a lubricant-conducting groove in its face extending from its front end to a point near the rear end thereof and normally opening into said enlargement, the ungrooved rear portion of said valve normally extending into said chamber-enlargement and serving in its abnormal position shut off the admission of lubricant to said chamber in front of the piston-valve.

12. A lubricating attachment, comprising a body containing a lubricant chamber having an inlet and an outlet, said chamber terminating at its inlet end in an enlargement, a piston-valve operable in said chamber for controlling the admission and expulsion of lubricant to and from the same, said valve having a lubricant-conducting groove in its face extending from its front end to a point near the rear end thereof and normally opening into said enlargement, the ungrooved rear portion of said valve normally extending into said chamber-enlargement and serving in its abnormal position to shut off the admission of lubricant to said chamber in front of the piston-valve, and a check-valve applied to the outlet end of said lubricant-chamber.

13. A lubricating attachment, comprising a body containing a lubricant chamber having an inlet and an outlet and terminating at its inlet end in an enlargement, and a piston-valve operable in said chamber and having a spiral, oil-conducting groove on its exterior face normally opening at one end into said enlargement, the piston-valve having a port in its head for establishing communication between the chamber-inlet and its enlargement.

14. A lubricating attachment, comprising a body containing a lubricant chamber having an inlet and an outlet, a spirally-ported piston valve operable in said chamber between the inlet and outlet ends thereof, seats at opposite ends of said chamber for limiting the stroke of the piston valve, the seat at the outlet end of the chamber being engaged by said piston valve at the end of its forward stroke to seal the admission of oil to said chamber, and a spring for normally holding the valve against the inlet end of the chamber.

15. A lubricating attachment, comprising a body containing a lubricant chamber having an inlet and an outlet, said chamber terminating at its inlet end in an enlargement and at its outlet end in a valve-seat, and a piston valve operable in said chamber for controlling the admission and expulsion of lubricant to and from the same, said valve having a lubricant-conducting groove in its face opening at its front end into said chamber and at its rear end into said chamber-enlargement, said valve-seat being engaged by said piston at the end of its forward stroke to seal the admission of lubricant to said chamber.

16. In a lubricating system for motor vehicles, the combination with a source of lubricant supply and a plurality of bearings to be lubricated, of a plurality of nipples for said bearings and each including a measuring chamber having an inlet, an outlet and a piston-operated valve having a restricted passage formed between the contiguous faces of said chamber and said valve for controlling the admission and expulsion of a predetermined quantity of lubricant to and from said chamber, said passage constituting a combined resistance and time element for predetermining the amount of lubricant delivered through the same, and a pump connected at its inlet end to said source of lubricant supply and at its outlet end to the inlet ends of said bearing nipples and controlling the piston-valves thereof.

17. In a lubricating system for motor vehicles, the combination with the circulating oil pump thereof and a plurality of bearings to be lubricated, of bearing nipples applied to said bearings and each containing a spirally-ported valve member for controlling the expulsion of a predetermined quantity of lubricant to its respective bearing, and a manually-operated booster pump interposed between said circulating pump and said bearing nipples.

18. A lubricating attachment, comprising a body containing a lubricant chamber having an inlet and an outlet, said chamber terminating at its inlet end in an enlargement, and a piston-valve operable in said chamber for controlling the admission and expulsion of lubricant to and from the same, the front portion of said valve extending into said chamber and constructed to provide a lubricant passage between the contiguous faces of the valve and the chamber for normally establishing communication between the front end of said chamber and its enlargement, the rear portion of said valve normally extending into the chamber-enlargement and serving in its abnormal position to shut off the admission of lubricant to said chamber in front of the piston-valve.

19. A lubricating system for the bearings of motor vehicles and the like, comprising a pump for delivering lubricant under pressure to the bearings and nipples applied to the bearings and each including a measuring chamber for the lubricant having an inlet connected with the pump and an outlet, the inlet end of said chamber terminating in an enlargement, a valve slidable in said chamber for controlling the admission and discharge of lubricant to and from the same, the operating stroke of the pump moving the valve in a direction to expel the lubricant from the chamber and the return stroke thereof moving said valve in the opposite direction to draw the lubricant from said chamber-enlargement between the contiguous faces of the valve and measuring-chamber into the latter, and a spring for normally holding said valve in its retracted position wherein the front portion of the valve is arranged to establish communication between that portion of the chamber in front of said valve and said chamber-enlargement, the rear portion of said valve normally extending into the enlargement and arrangement to enter the chamber proper during the major portion of its operating stroke to shut off the admission of lubricant to said chamber in front of the valve.

20. A lubricating attachment, comprising a body containing a lubricant chamber having an inlet and an outlet, a piston-valve operable in said chamber for controlling the admission and expulsion of lubricant to and from the same, and a constricted helical lubricant-conducting passage formed between the piston-valve and its chamber, said passage constituting a resistance element and terminating forwardly of the rear end of said valve for preventing the admission of lubricant to said chamber during the major portion of the forward stroke of the valve and for effecting a comparatively slow travel of the lubricant through said passage to said chamber on the return stroke of the valve.

21. A lubricating attachment, comprising a body containing a lubricant chamber having an inlet adapted to communicate with lubricant under pressure and an outlet, a piston-valve operable in said chamber for controlling the admission and expulsion of lubricant to and from the same, said valve being moved forwardly in the chamber by the lubricant under pressure to expel its charge, a spring for moving said valve rearwardly in its chamber to effect the replenishing of such chamber, and a helical lubricant-conducting passage formed between the piston-valve and its chamber, said passage constituting a resistance element and terminating forward of the rear end of said valve for preventing the admission of lubricant to said chamber during the major portion of the forward stroke of the valve and for effecting a comparatively slow feeding of the lubricant through said passage to said chamber on the return stroke of the valve.

22. A lubricating system for the chassis bearings of motor vehicles comprising a source of lubricant supply, a pressure pump having its inlet connected to said supply source and a plurality of lubricant conducting units applied to the chassis bearings and in connection with the pump outlet, each of said units containing a measuring chamber and a valve element having a spiral passage for delivering a predetermined quantity of lubricant to its bearing on the forward stroke of the pump and for replenishing said chamber with lubricant on the return strokes of the pump, and a filtering element for maintaining said passage free from foreign matter.

23. A lubricating system for the chassis bearings of motor vehicles comprising a source of lubricant supply, a pressure pump having its inlet connected to said supply source and a plurality of lubricant conducting units applied to the chassis bearings and in connection with the pump outlet, each of said units containing a measuring chamber and a valve element having a spiral passage for delivering a predetermined quantity of lubricant to its bearing on the forward stroke of the pump and for replenishing said chamber with lubricant on the return strokes of the pump, and a check valve for preventing flow of lubricant from the unit when the pressure is removed.

24. A lubricant feed unit for the chassis bearings of motor vehicles, comprising a body containing a lubricant chamber having an inlet and an outlet, a threaded attaching stem at the outlet end of said body and a coupling union at its inlet end adapted for attachment to a lubricant supply pipe, a spirally-ported resistance member disposed in said chamber for predetermining the amount of lubricant delivered to the bearing, a filtering element fitted in the inlet end of said body and about the discharge end of said supply pipe, and a check valve for normally preventing leakage of lubricant from the discharge end of the body.

25. A lubricating system comprising, in combination, a source of lubricant under pressure, conduits leading therefrom to a plurality of bearings to be lubricated, a metering device adjacent each bearing, said metering devices being constantly in communication with said source of lubricant under pressure, the pressure exerted by said source being incapable of operating said device and manual means adjacent said source of lubricant under pressure to increase the pressure on the lubricant in said conduits and thereby actuate said metering devices.

CHARLES W. MANZEL.